(12) United States Patent
Homma et al.

(10) Patent No.: US 12,215,617 B2
(45) Date of Patent: Feb. 4, 2025

(54) EXHAUST GAS PURIFICATION APPARATUS AND EXHAUST GAS PURIFICATION METHOD

(71) Applicant: KABUSHIKI KAISHA TOYOTA JIDOSHOKKI, Kariya (JP)

(72) Inventors: Takayuki Homma, Kariya (JP); Tadashi Takeuchi, Kariya (JP); Makoto Koike, Nagakute (JP); Tetsunori Suzuoki, Nagakute (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/279,520

(22) PCT Filed: Feb. 16, 2022

(86) PCT No.: PCT/JP2022/006255
§ 371 (c)(1),
(2) Date: Aug. 30, 2023

(87) PCT Pub. No.: WO2022/185926
PCT Pub. Date: Sep. 9, 2022

(65) Prior Publication Data
US 2025/0003361 A1    Jan. 2, 2025

(30) Foreign Application Priority Data

Mar. 5, 2021   (JP) .................................. 2021-035802

(51) Int. Cl.
*F01N 3/24* (2006.01)
*F01N 3/10* (2006.01)
(Continued)

(52) U.S. Cl.
CPC ............... *F01N 3/24* (2013.01); *F01N 3/206* (2013.01); *F01N 3/2066* (2013.01); *F01N 3/103* (2013.01);
(Continued)

(58) Field of Classification Search
CPC ........ F01N 3/0864; F01N 3/101; F01N 3/103; F01N 3/106; F01N 3/206; F01N 3/2066;
(Continued)

(56) References Cited

U.S. PATENT DOCUMENTS

2010/0139246 A1   6/2010  Andersson et al.
2010/0199636 A1*  8/2010  Goya ..................... F01N 13/009
                                                         60/299

(Continued)

FOREIGN PATENT DOCUMENTS

JP    2019-167822 A    10/2019
JP    2019-167823 A    10/2019
(Continued)

OTHER PUBLICATIONS

International Search Report for PCT/JP2022/006255 dated Apr. 26, 2022.

(Continued)

*Primary Examiner* — Binh Q Tran
(74) *Attorney, Agent, or Firm* — Sughrue Mion, PLLC

(57) ABSTRACT

An exhaust gas purification apparatus includes: an oxidation reduction catalytic converter; a selective reduction catalytic converter disposed downstream of the oxidation reduction catalytic converter; and a controller configured to perform a first control or a second control based on mixing ratios when a temperature is higher than a predetermined temperature. The first control is performed when the mixing ratio downstream of the selective reduction catalytic converter is greater than the mixing ratio upstream of the selective (Continued)

reduction catalytic converter so that the mixing ratio upstream of the selective reduction catalytic converter is changed from stoichiometric ratio to lean mixture ratio. The second control is performed when the mixing ratio downstream of the selective reduction catalytic converter is smaller than the mixing ratio upstream of the selective reduction catalytic converter so that the mixing ratio downstream of the selective reduction catalytic converter is changed from stoichiometric ratio to lean mixture ratio.

5 Claims, 6 Drawing Sheets

(51) Int. Cl.
    *F01N 3/20*     (2006.01)
    *F01N 9/00*     (2006.01)
    *F01N 11/00*     (2006.01)
    *F02D 41/02*     (2006.01)
    *F02D 41/14*     (2006.01)

(52) U.S. Cl.
    CPC .............. *F01N 9/005* (2013.01); *F01N 11/002* (2013.01); *F01N 11/007* (2013.01); *F01N 2240/25* (2013.01); *F01N 2560/025* (2013.01); *F01N 2610/02* (2013.01); *F01N 2900/04* (2013.01); *F01N 2900/1404* (2013.01); *F01N 2900/1626* (2013.01); *F02D 41/0295* (2013.01); *F02D 41/1454* (2013.01); *F02D 2041/1468* (2013.01)

(58) Field of Classification Search
    CPC .......... F01N 3/24; F01N 9/005; F01N 11/002; F01N 11/005; F01N 11/007; F01N 2240/25; F01N 2430/06; F01N 2560/021; F01N 2560/025; F01N 2560/06; F01N 2610/02; F01N 2900/04; F01N 2900/1404; F01N 2900/1602; F01N 2900/1624; F01N 2900/1626; F02D 19/0644; F02D 41/0295; F02D 41/1454; F02D 41/1455; F02D 41/1456; F02D 41/1475; F02D 2041/1468; F02D 2200/0802

See application file for complete search history.

(56) References Cited

U.S. PATENT DOCUMENTS

| | | | |
|---|---|---|---|
| 2010/0204904 A1* | 8/2010 | Miyashita | ........... F02D 41/1454 701/103 |
| 2014/0079616 A1* | 3/2014 | Fedeyko | ................ B01D 53/58 423/237 |
| 2014/0105816 A1* | 4/2014 | Grannell | ................... C01B 3/06 422/198 |
| 2014/0311135 A1* | 10/2014 | Miyagawa | .......... F02D 41/0025 60/287 |
| 2020/0088665 A1* | 3/2020 | Takizawa | ............. G01N 31/223 |
| 2022/0170400 A1* | 6/2022 | Van Nieuwstadt | ......................... F02D 41/1459 |

FOREIGN PATENT DOCUMENTS

| | | |
|---|---|---|
| JP | 6742060 B2 | 8/2020 |
| WO | 2020/233976 A1 | 11/2020 |

OTHER PUBLICATIONS

Written Opinion for PCT/JP2022/006255 dated Apr. 26, 2022.
Communication dated Sep. 16, 2024, issued in Indian Application No. 202347057773.

* cited by examiner

EXHAUST GAS PURIFICATION APPARATUS AND EXHAUST GAS PURIFICATION METHOD

CROSS REFERENCE TO RELATED APPLICATIONS

This application is a National Stage of International Application No. PCT/JP2022/006255 filed Feb. 16, 2022, claiming priority based on Japanese Patent Application No. 2021-035802 filed Mar. 5, 2021, the contents of all of which are incorporated herein by reference in their entirety.

TECHNICAL FIELD

The present disclosure relates to an exhaust gas purification apparatus and an exhaust gas purification method.

BACKGROUND ART

Internal combustion engines emit exhaust containing hazardous substances, such as nitrogen oxide (NOx) including nitric oxide (NO) and nitrogen dioxide ($NO_2$), and the hazardous substances are catalytically purified. Examples of the internal combustion engines include ammonia engines that use ammonia as fuel. Because ammonia does not contain a carbon atom, the ammonia engines have an advantage of combustion without emitting carbon dioxide.

Fully combusted ammonia is completely converted to nitrogen and water. However, ammonia combustion generates incomplete combustion components actually, and the ammonia engines emit exhaust containing the incomplete combustion components, such as unreacted ammonia and nitrogen oxide containing NO. Accordingly, unreacted ammonia and nitrogen oxide containing NO in the exhaust are required to be catalytically purified.

For example, an exhaust gas purification apparatus for purifying exhaust from an internal combustion engine, which is configured to combust ammonia to obtain a driving force, may reduce emission of ammonia. Such an exhaust gas purification apparatus may include a catalytic converter having three-way catalyst function and ammonia adsorption function and disposed in a main flow passage through which the exhaust from the internal combustion engine using ammonia as fuel flows, and a controller configured to change mixing ratio of the exhaust upstream of the catalytic converter from stoichiometric ratio to lean mixture ratio based on information related to at least one of ammonia desorption from the catalytic converter and an activation temperature of the catalytic converter (see patent literature 1, for example).

Also, such an exhaust gas purification apparatus may include an oxidation reduction catalytic converter configured to provide oxidation catalysis and reduction catalysis and disposed in a main flow passage through which exhaust from an internal combustion engine using ammonia as fuel flows, a selective reduction catalytic converter disposed in the main flow passage, a temperature acquirer configured to acquire a temperature of the selective reduction catalytic converter, and a controller configured to change mixing ratio of the exhaust upstream of the oxidation reduction catalytic converter and the selective reduction catalytic converter, from stoichiometric ratio to lean mixture ratio when the temperature of the selective reduction catalytic converter acquired by the temperature acquirer is higher than an activation temperature of the selective reduction catalytic converter (see patent literature 2, for example).

CITATION LIST

Patent Literature

Patent Literature 1: Japanese Patent Application Publication No. 2019-167822
Patent Literature 2: Japanese Patent Application Publication No. 2019-167823

SUMMARY OF THE INVENTION

Technical Problem

The exhaust gas purification apparatus according to patent literatures 1 and 2 detect the mixing ratio of the exhaust only downstream of the internal combustion engine, so that the exhaust gas purification apparatus may not sufficiently utilize the functions of the oxidation reduction catalytic converter and the selective reduction catalytic converter. For example, the exhaust gas purification apparatus may include the oxidation reduction catalytic converter disposed upstream in the main flow passage through which exhaust flows and the selective reduction catalytic converter downstream of the oxidation reduction catalytic converter, and change the mixing ratio of the exhaust upstream of the catalytic converters from stoichiometric ratio to lean mixture ratio. If the change is not appropriate, the mixture concentration at the selective reduction catalytic converter may become lower than stoichiometric ratio, which may lead to insufficient purification of the exhaust. Accordingly, the exhaust gas purification apparatus, which purifies the exhaust from the internal combustion engine by using the mixing ratio of the exhaust, needs an improvement in its control.

The present disclosure is related to an exhaust gas purification apparatus and an exhaust gas purification method that are capable of reducing emission of unburned ammonia and nitrogen oxide from an internal combustion engine using ammonia as fuel.

Solution to Problem

The present disclosure is made to solve at least a part of the above-mentioned problems, and may be realized as aspects described in the following manner.

According to the first aspect of the present disclosure, an exhaust gas purification apparatus includes:
an oxidation reduction catalytic converter disposed in a main flow passage through which exhaust flows from an internal combustion engine that is configured to combust ammonia to obtain a driving force, the oxidation reduction catalytic converter being configured to provide oxidation catalysis and reduction catalysis;
a selective reduction catalytic converter disposed downstream of the oxidation reduction catalytic converter in the main flow passage and configured to absorb ammonia having flowed through the oxidation reduction catalytic converter;
a temperature acquirer configured to acquire a temperature of a region related to a temperature of the selective reduction catalytic converter;
a mixing ratio acquirer configured to acquire mixing ratios of the exhaust upstream and downstream of the selective reduction catalytic converter, wherein the mixing ratios indicate a relationship of ammonia and oxygen; and a controller configured to perform a first control or a second control based on the mixing ratio of the exhaust acquired by the mixing ratio acquirer when the temperature acquired by the temperature acquirer is higher than a predetermined temperature that indicates activation of the selective reduction catalytic converter, the controller being configured to perform the first control when the mixing ratio of the exhaust downstream of the selective reduction catalytic converter is greater than the mixing ratio of the exhaust upstream of the selective reduction catalytic converter so that the first control changes the mixing ratio of the exhaust upstream of the oxidation reduction catalytic converter to change the mixing ratio of the exhaust upstream of the selective reduction catalytic converter from stoichiometric ratio to lean mixture ratio, the controller being configured to perform the second control when the mixing ratio of the exhaust downstream of the selective reduction catalytic converter is smaller than the mixing ratio of the exhaust upstream of the selective reduction catalytic converter so that the second control changes the mixing ratio of the exhaust upstream of the oxidation reduction catalytic converter to change the mixing ratio of the exhaust downstream of the selective reduction catalytic converter from stoichiometric ratio to lean mixture ratio.

According to the second aspect of the present disclosure, in the exhaust gas purification apparatus of the first aspect, the controller is configured to
  perform a third control when a difference between the mixing ratio of the exhaust upstream of the selective reduction catalytic converter and the mixing ratio of the exhaust downstream of the selective reduction catalytic converter is within a predetermined range so that the third control changes the mixing ratio of the exhaust upstream of the selective reduction catalytic converter from lean mixture ratio to stoichiometric ratio.

According to the third aspect of the present disclosure, in the exhaust gas purification apparatus of the second aspect, the controller is configured to
  perform a control so that abnormality information is emitted if the difference is out of a predetermined range after the elapse of a predetermined time after start of the first control or the second control.

According to the fourth aspect of the present disclosure, in the exhaust gas purification apparatus of the second aspect,
the controller is configured to
perform the first control, the second control, and the third control at least once at the start of the internal combustion engine.

According to the fifth aspect of the present disclosure,
an exhaust gas purification method is for purifying exhaust from an internal combustion engine that is configured to combust ammonia to obtain a driving force, by using an oxidation reduction catalytic converter and a selective reduction catalytic converter, and the exhaust gas purification method includes:
acquiring a temperature of a region related to a temperature of the selective reduction catalytic converter;
acquiring mixing ratios of the exhaust upstream and downstream of the selective reduction catalytic converter, wherein the mixing ratios indicate a relationship of ammonia and oxygen; and
performing a first control or a second control based on the acquired mixing ratio of the exhaust when the acquired temperature is higher than a predetermined temperature that indicates activation of the selective reduction catalytic converter, wherein the first control is performed when the mixing ratio of the exhaust downstream of the selective reduction catalytic converter is greater than the mixing ratio of the exhaust upstream of the selective reduction catalytic converter so that the first control changes the mixing ratio of the exhaust upstream of the oxidation reduction catalytic converter to change the mixing ratio of the exhaust upstream of the selective reduction catalytic converter from stoichiometric ratio to lean mixture ratio, and wherein the second control is performed when the mixing ratio of the exhaust downstream of the selective reduction catalytic converter is smaller than the mixing ratio of the exhaust upstream of the selective reduction catalytic converter so that the second control changes the mixing ratio of the exhaust upstream of the oxidation reduction catalytic converter to change the mixing ratio of the exhaust downstream of the selective reduction catalytic converter from stoichiometric ratio to lean mixture ratio.

According to the sixth aspect of the present disclosure,
a program is stored in a computer readable medium and causes a computer to implement exhaust gas purification by using an oxidation reduction catalytic converter and a selective reduction catalytic converter for purifying exhaust from an internal combustion engine that is configured to combust ammonia to obtain a driving force, and the exhaust gas purification includes:
acquiring a temperature of a region related to a temperature of the selective reduction catalytic converter;
acquiring mixing ratios of the exhaust upstream and downstream of the selective reduction catalytic converter, wherein the mixing ratios indicate a relationship of ammonia and oxygen; and
performing a first control or a second control based on the acquired mixing ratio of the exhaust when the acquired temperature is higher than a predetermined temperature that indicates activation of the selective reduction catalytic converter, wherein the first control is performed when the mixing ratio of the exhaust downstream of the selective reduction catalytic converter is greater than the mixing ratio of the exhaust upstream of the selective reduction catalytic converter so that the first control changes the mixing ratio of the exhaust upstream of the oxidation reduction catalytic converter to change the mixing ratio of the exhaust upstream of the selective reduction catalytic converter from stoichiometric ratio to lean mixture ratio, and wherein the second control is performed when the mixing ratio of the exhaust downstream of the selective reduction catalytic converter is smaller than the mixing ratio of the exhaust upstream of the selective reduction catalytic converter so that the second control changes the mixing ratio of the exhaust upstream of the oxidation reduction catalytic converter to change the mixing ratio of the exhaust downstream of the selective reduction catalytic converter from stoichiometric ratio to lean mixture ratio.

Advantageous Effects of the Invention

According to the present disclosure, emission of unburned ammonia and nitrogen oxide from an internal combustion engine using ammonia as fuel is reduced.

DESCRIPTION OF EMBODIMENTS

The following will describe an embodiment of the present disclosure in detail. However, the present disclosure is not limited to the following embodiment. In the embodiment, structural elements including steps are not essential unless specified or considered to be clearly essential in principle. The same applies to numerical values and their ranges, and the present disclosure is not limited to the numerical values and their ranges. The numerical values and their ranges are merely an example, and may be replaced with other numerical values and their ranges.

[Exhaust Gas Purification Apparatus]

The following will describe an exhaust gas purification apparatus according to an embodiment of the present disclosure.

Figure 1:
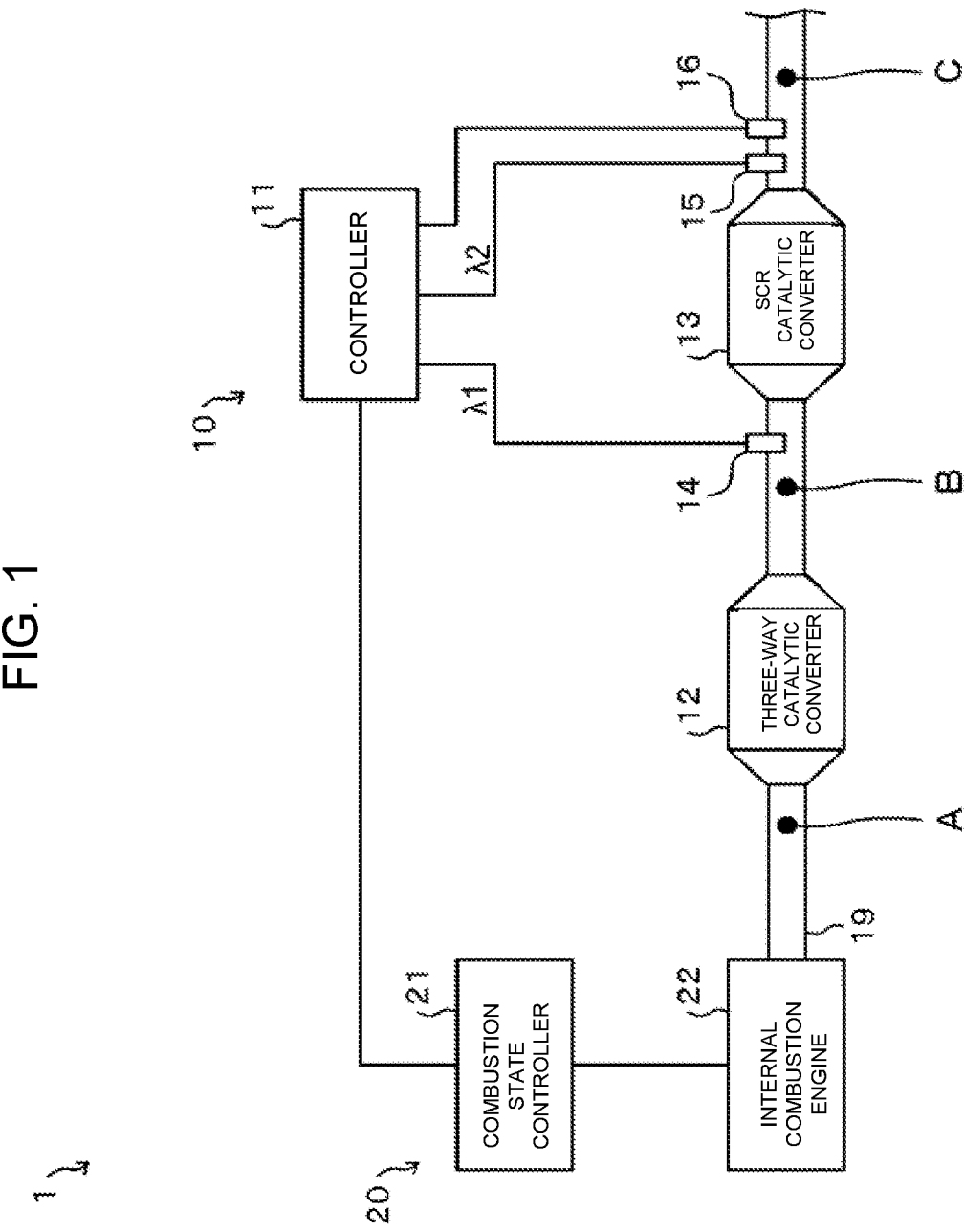
FIG. 1 is a schematic diagram of an exhaust gas purification apparatus according to an embodiment of the present disclosure.

FIG. 1 is a schematic diagram of an exhaust gas purification apparatus according to the present disclosure.

FIG. 1 is a schematic diagram of an engine system 1 according to an embodiment of the present disclosure. The engine system 1 is mounted on a vehicle and generates a driving force for driving the vehicle, for example. The engine system 1 includes a combustion apparatus 20 for generating the driving force and an exhaust gas purification apparatus 10 for purifying hazardous substances, such as ammonia ($NH_3$) and nitrogen oxide (NOx), in exhaust from the combustion apparatus 20, for example.

The combustion apparatus 20 includes a combustion state controller 21 and an internal combustion engine 22. Examples of the internal combustion engine 22 include an ammonia engine for combusting ammonia gas to obtain a driving force. In the following description, the ammonia gas is simply referred to as ammonia. The combustion state controller 21 adjusts a throttle (not illustrated) to change a rate of air flow into the internal combustion engine 22 and adjusts a fuel supply valve (not illustrated) to change a fuel supply amount to the internal combustion engine 22. Accordingly, the combustion state controller 21 controls the air-fuel ratio (mixing ratio) in exhaust in and from the internal combustion engine 22 between rich mixture ratio, stoichiometric ratio, and lean mixture ratio. When the mixing ratio is defined as $\phi$=theoretical air-fuel ratio/actual air-fuel ratio, the rich mixing ratio, the stoichiometric ratio, and the lean mixture ratio are $\phi>1$, $\phi=1$, and $\phi<1$, respectively. Equivalence ratio is also expressed by $\phi$. An electronic control unit (ECU) serves as the combustion state controller 21, for example.

The exhaust gas purification apparatus 10 according to the embodiment purifies hazardous substances in exhaust by using an oxidation reduction catalytic converter and a selective reduction catalytic converter. In the following description, a three-way catalytic converter serves as the oxidation reduction catalytic converter, and a selective catalyst reduction catalytic converter (SCR catalytic converter) having a function of absorption catalyst serves as the selective reduction catalytic converter, for example. The oxidation reduction catalytic converter is not limited to the three-way catalytic converter but has to provide oxidation catalysis and reduction catalysis. For example, the oxidation reduction catalytic converter may be a catalytic converter that uses ceramic, titanium oxide, or the like as a carrier, and supports noble metal, such as platinum, rhodium, or palladium as an active catalytic component. The selective reduction catalytic converter is not limited to the SCR catalytic converter but has to have ammonia absorbing property. For example, the selective reduction catalytic converter may be a catalytic converter that uses ceramic, titanium oxide, or the like as a carrier, and supports zeolite as an active catalytic component.

In the following description, one side of the exhaust gas purification apparatus 10 adjacent to the internal combustion engine 22 and the other side of the exhaust gas purification apparatus 10 distant from the internal combustion engine 22 are referred to as an upstream side and a downstream side, respectively. In FIG. 1, the left side corresponds to the upstream side, and the right side corresponds to the downstream side.

The exhaust gas purification apparatus 10 includes a controller 11 that is configured to control devices of the exhaust gas purification apparatus 10 and an exhaust pipe 19 extending from the internal combustion engine 22, and includes a three-way catalytic converter 12, an SCR catalytic converter 13, a first mixing ratio acquirer 14, a second mixing ratio acquirer 15, and a temperature acquirer 16 that are disposed in the exhaust pipe 19.

The controller 11 receives signals that indicate values acquired by the first mixing ratio acquirer 14, the second mixing ratio acquirer 15, and the temperature acquirer 16. The controller 11 uses the received values to perform controls (FIG. 2), which are described later, and changes the mixing ratio of the internal combustion engine 22 to change the mixing ratio of the exhaust upstream of the three-way catalytic converter 12 and the SCR catalytic converter 13. The ECU serves as the controller 11, for example. The exhaust pipe 19 has a main flow passage through which the exhaust emitted from the internal combustion engine 22 flows. The exhaust from the internal combustion engine 22 is released to outside air through the three-way catalytic converter 12 and the SCR catalytic converter 13 while flowing through the main flow passage in the exhaust pipe 19.

The three-way catalytic converter 12 is located most upstream in the main flow passage, in other words, located upstream of the SCR catalytic converter 13. The three-way catalytic converter 12 is capable of purifying ammonia, NOx, and hydrogen ($H_2$) in the exhaust, but has a property that purification performance of ammonia, NOx, and hydrogen decreases if the mixing ratio falls outside the predetermined range around stoichiometric ratio.

The exhaust gas purification apparatus 10 may include, upstream of the three-way catalytic converter 12, a sensor (not illustrated) for measuring an oxygen ($O_2$) level (i.e., mixing ratio) in the exhaust (exhaust gas) from the internal combustion engine 22. The controller 11 may acquire the mixing ratio by using the sensor. The sensor for acquiring the mixing ratio upstream of the three-way catalytic converter 12 may acquire a measuring signal measured by an oxygen sensor or an ammonia sensor disposed in the exhaust pipe 19, for example.

The exhaust gas purification apparatus 10 may include a sensor (not illustrated) for measuring a temperature (i.e., floor temperature) of a catalytic converter in the three-way catalytic converter 12. The sensor may measure a temperature in the vicinity of the inlet and the outlet of the three-way catalytic converter 12, instead of the floor temperature of the three-way catalytic converter 12.

The SCR catalytic converter 13 is located most downstream in the main flow passage, in other words, located downstream of the three-way catalytic converter 12. The SCR catalytic converter 13 may purify NOx in the exhaust with ammonia as a reducing agent. The temperature acquirer 16 is a sensor for measuring a temperature related to the temperature of the SCR catalytic converter 13 and configured to measure a temperature (i.e., floor temperature) of the catalyst in the SCR catalytic converter 13 in the embodiment. The temperature acquirer 16 may measure a temperature in the region around the SCR catalytic converter 13, e.g., in the vicinity of the inlet and the outlet of the SCR catalytic converter 13, instead of the floor temperature of the SCR catalytic converter 13. The temperature acquirer 16 is an example of the temperature acquirer of the present disclosure.

The first mixing ratio acquirer 14 and the second mixing ratio acquirer 15 are configured to acquire, in the vicinity of the inlet and the outlet of the SCR catalytic converter 13, the oxygen ($O_2$) level (i.e., mixing ratio) in the exhaust (exhaust gas) from the internal combustion engine 22. That is, the first mixing ratio acquirer 14 is disposed around the inlet of the SCR catalytic converter 13, and acquires, downstream of the three-way catalytic converter 12 and upstream of the SCR catalytic converter 13, the oxygen ($O_2$) level (i.e., mixing ratio) in the exhaust (exhaust gas) from the internal combustion engine 22. The first mixing ratio acquirer 14 may acquire a measuring signal measured by an oxygen sensor or an ammonia sensor disposed in the exhaust pipe 19, for example. The second mixing ratio acquirer 15 is disposed downstream of the SCR catalytic converter 13 (around the outlet of the SCR catalytic converter 13), and acquires, downstream of the SCR catalytic converter 13, the oxygen ($O_2$) level (i.e., mixing ratio) in the exhaust (exhaust gas) from the internal combustion engine 22. The second mixing ratio acquirer 15 may acquire a measuring signal measured by an oxygen sensor or an ammonia sensor disposed in the exhaust pipe 19, for example. The first mixing ratio acquirer 14 and the second mixing ratio acquirer 15 are an example of the mixing ratio acquirer of the present disclosure. The first mixing ratio acquirer 14 is an example of the mixing ratio acquirer to acquire the mixing ratio upstream of the selective reduction catalytic converter, and the second mixing ratio acquirer 15 is an example of the mixing ratio acquirer to acquire the mixing ratio downstream of the selective reduction catalytic converter.

The oxygen ($O_2$) level in the exhaust (exhaust gas) from the internal combustion engine 22, that is, the mixing ratio of the exhaust in the exhaust pipe 19, may be regarded as a level indicating excess or deficiency of air containing oxygen ($O_2$). In the present disclosure, an excess air ratio $\lambda$ indicating a level of excess of air relative to the stoichiometric ratio indicates a level indicating excess or deficiency of air relative to the stoichiometric ratio. In the following description, an excess air ratio $\lambda 1$ serves as the mixing ratio of the exhaust acquired by the first mixing ratio acquirer 14, and an excess air ratio $\lambda 2$ serves as the mixing ratio of the exhaust acquired by the second mixing ratio acquirer 15.

Figure 2:
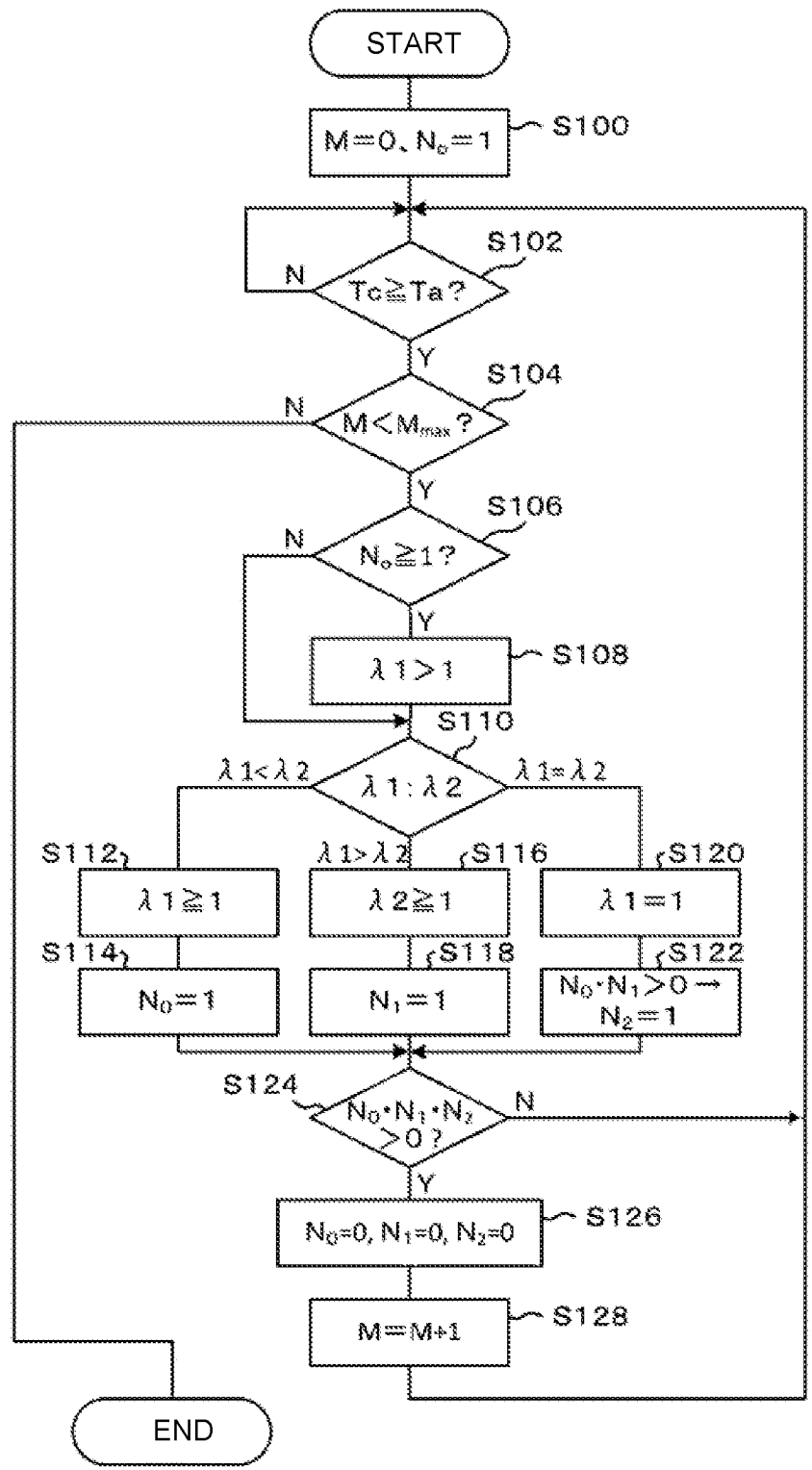
FIG. 2 is a flowchart of operation of the exhaust gas purification apparatus according to the embodiment of the present disclosure.

FIG. 2 is a flowchart of the control process of the controller 11. The control shown in FIG. 2 is performed for monitoring the state of the exhaust gas purification apparatus 10, and related to ammonia absorption in the SCR catalytic converter 13. The control shown in FIG. 2 is performed by the start of the internal combustion engine 22. The control shown in FIG. 2 is not limited to the control performed at the start of the internal combustion engine 22. For example, the control may be performed regularly, or may be performed irregularly according to a predetermined start condition. The control process in FIG. 2 is an example of a program of the present disclosure, which is stored in a computer readable medium (memory) and causes a computer to implement exhaust gas purification for purifying the exhaust from the internal combustion engine 22 that is configured to combust ammonia to obtain the driving force.

At step S100, the controller 11 sets an initial value for starting the control. In the embodiment, a count value M and a discriminant index $N_i$ (i=0, 1, 2) are set as the initial value. The count value M represents a repeat count of this control. The discriminant index $N_i$ indicates a behavior of the SCR catalytic converter 13.

In the embodiment, the behavior of the SCR catalytic converter 13 indicated by the discriminant index $N_i$ is a state of the SCR catalytic converter 13 such as "absorption", "regeneration", or "regeneration completion" in the catalytic converter 13. The discriminant index $N_0$ indicates the state of absorption in the SCR catalytic converter 13 where ammonia is absorbed in the SCR catalytic converter 13, and the discriminant index $N_0$ is set to "1" for the state of absorption in the SCR catalytic converter 13, and reset (i.e., set to "0") for other states of the SCR catalytic converter 13. The discriminant index $N_1$ indicates the state of regeneration in the SCR catalytic converter 13 where the absorption capacity of the SCR catalytic converter 13 is restored by consumption of absorbed ammonia, and the discriminant index $N_1$ is set to "1" for the state of regeneration in the SCR catalytic converter 13, and reset (i.e., set to "0") for other states of the SCR catalytic converter 13. The discriminant index $N_2$ indicates the state of regeneration completion in the SCR catalytic converter 13 where the regeneration in the SCR catalytic converter 13 is completed, and the discriminant index $N_2$ is set to "1" for the state of regeneration completion in the SCR catalytic converter 13, and reset (i.e., set to "0") for other states of the SCR catalytic converter 13. At step S100, M=0, $N_0$=1, $N_1$=0, and $N_2$=0 are set as the initial value so as to obtain the state of absorption in the SCR catalytic converter 13 at least once and the state of the regeneration in the SCR catalytic converter 13.

The controller 11 moves to step S102 after setting the initial value at step S100.

The controller 11 receives a temperature of the SCR catalytic converter 13 from the temperature acquirer 16 at step S102, and determines whether the temperature Tc of the SCR catalytic converter 13 received is equal to or higher than a predetermined temperature Ta of the SCR catalytic converter 13. The predetermined temperature Ta is a predetermined catalytic reaction start temperature in the SCR catalytic converter 13. In the embodiment, an activation temperature serves as the catalytic reaction start temperature in the SCR catalytic converter 13, for example. The activation temperature means the lower limit temperature at which NOx-reduction reaction by ammonia becomes active in the SCR catalytic converter 13, and the activation temperature is predetermined and stored in the memory (not illustrated) in the controller 11. The controller 11 monitors the temperature of the SCR catalytic converter 13, and determines No repeatedly until the temperature Tc of the SCR catalytic converter 13 becomes equal to or higher than the predetermined temperature (activation temperature) Ta. When the temperature Tc of the SCR catalytic converter 13 becomes equal to or higher than the predetermined temperature (activation temperature) Ta, the controller 11 determines Yes at step S102 and moves to step S104.

The predetermined temperature Ta is set to a temperature equal to or higher than the activation temperature as an example of the catalytic reaction start temperature in the SCR catalytic converter 13 in the present disclosure, but the predetermined temperature Ta is not limited to the activation temperature of the SCR catalytic converter 13. For example, the predetermined temperature Ta has to be a temperature that allows determination of the start of reaction in the SCR catalytic converter 13, but may be a temperature, such as a cooling water temperature of the internal combustion engine 22, a temperature in regions around the SCR catalytic converter 13 (e.g., in the vicinity of the inlet and the outlet of the SCR catalytic converter 13), or a temperature calculated with a prediction formula (model). When a temperature other than the activation temperature is used as the temperature of the SCR catalytic converter 13, the temperature of the SCR catalytic converter 13, such as the floor temperature of the SCR catalytic converter 13, may be estimated from the acquired temperature by using a known estimation method.

At step S102, the controller 11 determines whether the temperature Tc of the SCR catalytic converter 13 is equal to or higher than the predetermined temperature Ta (Tc≥Ta), but the controller 11 may determine a temperature of a catalytic converter of the exhaust gas purification apparatus 10. For example, the controller 11 may determine whether a temperature of the three-way catalytic converter 12 is equal to or higher than a predetermined catalytic reaction start temperature in the three-way catalytic converter 12. This determination effectively functions immediately after the start of the internal combustion engine 22. That is, the controller 11 may determine Yes at step S102 and move to step S104 when the temperature of the three-way catalytic converter 12 is equal to or higher than the predetermined catalytic reaction start temperature. At step 102, the controller 11 may determine, after the temperature of the three-way catalytic converter 12 becomes equal to or higher than the predetermined catalytic reaction start temperature, whether the temperature of the SCR catalytic converter 13 is equal to or higher than the predetermined temperature Ta. Furthermore, the controller 11 may determine whether the temperature of the three-way catalytic converter 12 and the temperature of the SCR catalytic converter 13 are equal to or higher than the activation temperature of the three-way catalytic converter 12 and the activation temperature of the activation temperature of the SCR catalytic converter 13, respectively.

At step S104, the controller 11 determines whether a termination condition is satisfied. In the embodiment, the controller 11 determines satisfaction of the termination condition by determining whether the count value M is lower than a predetermined maximum value $M_{max}$. The controller 11 determines No at step S104 when the count value M is equal to or greater than the maximum value $M_{max}$ (M≥$M_{max}$), and terminates this routine. On the other hand, the controller 11 determines Yes at step S104 and moves to step S106 when the count value M is lower than the maximum value $M_{max}$ (M<$M_{max}$). The maximum value $M_{max}$ may be determined arbitrarily depending on the operational status of the internal combustion engine 22.

For example, if $M_{max}$=2 is set as the termination condition, the controller 11 determines that the termination condition is satisfied when the processing at the start of the internal combustion engine 22 is terminated (M=2). This termination condition is effective for removal of ammonia absorbed in the SCR catalytic converter 13 at the start of the internal combustion engine 22.

As the termination condition, the maximum value $M_{max}$ may be set to the count value of 3 or more. For example, setting the maximum value $M_{max}$ to a predetermined small count value, such as 3 or 4, is effective for a case where the internal combustion engine 22 restarts after a lapse of predetermined period of time from stop of the internal combustion engine 22 immediately after the start. Specifically, the internal combustion engine 22 may restart after stopping in a situation where the temperature of the three-way catalytic converter 12 does not reach the activation temperature of the three-way catalytic converter 12 after the start of the internal combustion engine 22 and the exhaust gas remains in the SCR catalytic converter 13. In this case, setting the maximum value $M_{max}$ to a small count value, such as 3 or 4, is effective for removal of ammonia at the restart of the internal combustion engine 22. That is, this termination condition is effective for removable of ammonia absorbed in the SCR catalytic converter 13 at the restart of the internal combustion engine 22.

The maximum value $M_{max}$ is not limited to the aforementioned count value, and as the termination condition, the maximum value $M_{max}$ may be set to a count value that is greater than the aforementioned count value. This termination condition is effective for removal of ammonia absorbed in the SCR catalytic converter 13 when the internal combustion engine 22 is continuously in a high-load state where a load is higher than a normal load. Examples of the high-load state include an acceleration state of a movable body, such as a vehicle to which the internal combustion engine 22 is mounted. In order to continue processing while the movable body is accelerated, the controller 11 may detect that the movable body is accelerated, and determine Yes at step S104 while the movable body is accelerated.

The controller 11 determines $N_0$≥1 at step S106 to recognize the state of absorption in the SCR catalytic converter 13. When $N_0$ is equal to or greater than 1 ($N_0$≥1), the controller 11 determines Yes at step S106 and moves to step 108. When $N_0$ is lower than 1 ($N_0$<1), the controller 11 determines No at step S106 and moves to step 110 while skipping step S108.

At step S108, the controller 11 performs a control so that the mixing ratio in the internal combustion engine 22 changes from stoichiometric ratio to lean mixture ratio. Specifically, the controller 11 transmits to the combustion state controller 21 a signal for changing the mixing ratio in the internal combustion engine 22 to lean mixture ratio. The combustion state controller 21 receives the signal, and changes the air and fuel supply amount to the internal combustion engine 22 to change the mixing ratio in the internal combustion engine 22 from stoichiometric ratio to lean mixture ratio. Accordingly, the mixing ratio of the exhaust upstream of the three-way catalytic converter 12 changes from stoichiometric ratio to lean mixture ratio. The excess air ratio λ1 acquired by the first mixing ratio acquirer 14 therefore becomes greater than 1 (λ1>1), which is lean ratio expressing an excess of air.

The temperature of the three-way catalytic converter 12 is gradually increased by the high temperature exhaust (exhaust gas) emitted from the internal combustion engine 22, and incomplete combustion components in the three-way catalytic converter 12, which has flowed into the three-way catalytic converter 12 by the time the temperature reached the catalytic reaction start temperature in the three-way catalytic converter 12, flows from the three-way catalytic converter 12 into the SCR catalytic converter 13. That is, ammonia that is not purified by the three-way catalytic converter 12 flows into the SCR catalytic converter 13 downstream of the three-way catalytic converter 12. Ammonia is absorbed in the SCR catalytic converter 13, and prevented from flowing out of the SCR catalytic converter 13. Therefore, the flow amount of ammonia flowing out of the SCR catalytic converter 13 changes according to the excess air ratio λ1 upstream of the SCR catalytic converter 13 and the behavior of the SCR catalytic converter 13.

The controller 11 adjusts the mixing ratio in the internal combustion engine 22 so that the SCR catalytic converter 13 appropriately processes ammonia based on the relationship between the excess air ratio λ1 upstream of the SCR catalytic converter 13 and the excess air ratio 2 downstream of the SCR catalytic converter 13. Specifically, the controller 11 acquires the excess air ratio λ1 and the excess air ratio λ2 at step S110 to determine the magnitude relationship between the excess air ratio λ1 and the excess air ratio λ2. That is, at step S110, the controller 11 determines the magnitude relationship, such as λ1<λ2, λ1>λ2, or λ1=λ2.

In the state of absorption in the SCR catalytic converter 13 where the SCR catalytic converter 13 absorbs ammonia having flowed into the SCR catalytic converter 13, the ratio of air (oxygen) to ammonia (hydrogen) changes before and after the SCR catalytic converter 13, so that the excess air ratio A becomes different before and after the SCR catalytic converter 13. Specifically, the excess air ratio A becomes λ1<λ2 before and after the SCR catalytic converter 13.

When the controller 11 determines at step S110 that the excess air ratio λ2 is greater than the excess air ratio λ1 (λ2>λ1), the controller 11 recognizes the state of absorption in the SCR catalytic converter 13 and moves to step S112. At step S112, the controller 11 performs a control so that the excess air ratio λ1 is adjusted to cause excess of air (λ1≥1). Specifically, the controller 11 transmits to the combustion state controller 21 a signal for changing the mixing ratio in the internal combustion engine 22 to lean mixture ratio. The combustion state controller 21 receives the signal, and changes the air and fuel supply amount to the internal combustion engine 22 to change the mixing ratio in the internal combustion engine 22 from stoichiometric ratio to lean mixture ratio so that the excess air ratio λ1 is adjusted to cause excess of air (λ1≥1). The controller 11 sets the discriminant index $N_0$=1 at step S114, and moves to step 124. The processing at step S112 is an example of the first control of the present disclosure.

At step S112, when the excess air ratio λ1 is equal to 1 (λ1=1), the incomplete combustion components are decreased to approximately zero by oxidation-reduction reaction by a catalyst. When the excess air ratio λ1 is greater than 1 (λ1>1), nitrogen oxide remains, but ammonia and hydrogen are oxidized. The excess air ratio λ1 may be preferably controlled so that a period of λ1<1 is short or eliminated so as to decrease ammonia flowing into the SCR catalytic converter 13.

The incomplete combustion components flowing into the SCR catalytic converter 13 are decreased to approximately zero to eliminate ammonia, so that the difference in the excess air ratio A before and after the SCR catalytic converter 13 is eliminated, i.e., λ2=λ1. When λ2 is equal to λ1 (λ2=λ1), the three-way catalytic converter 12 sufficiently purifies ammonia. Ammonia being absorbed in the SCR catalytic converter 13 is held as is until a temperature reaches the ammonia desorption temperature.

According to the present disclosure, the incomplete combustion components are decreased to approximately zero by oxidation-reduction reaction when the excess air ratio λ1 is equal to 1 (λ1=1), but the incomplete combustion components may not be decreased to approximately zero by oxidation-reduction reaction. For example, the difference between the excess air ratio λ1 and the excess air ratio λ2 may be within a predetermined range including zero. The predetermined range may be determined in consideration of an acceptable amount or ratio of incomplete combustion components for purified exhaust (exhaust gas).

On the other hand, when the excess air ratio λ1 is greater than 1 (λ1>1), the exhaust (exhaust gas) contains much oxygen. Accordingly, although ammonia and hydrogen are oxidized by the three-way catalytic converter 12, nitrogen oxide partly remains without being purified, and nitrogen oxide containing oxygen therefore flows into the SCR catalytic converter 13. In the SCR catalytic converter 13, nitrogen oxide and ammonia absorbed in the SCR catalytic converter 13 are converted to nitrogen and water by SCR reaction by means of the following formulas (1) to (3). Ammonia is added to the composition of gas flowing into the SCR catalytic converter 13 during the reaction, so that the excess air ratio A becomes λ1>λ2.

$$4NO+4NH_3+O_2 \rightarrow 4N_2+6H_2O \quad (1)$$

$$NO+NO_2+2NH_3 \rightarrow 2N_2+3H_2O \quad (2)$$

$$2NO_2+2NH_3 \rightarrow N_2+N_2O+3H_2O \quad (3)$$

When the controller 11 determines at step S110 that the excess air ratio λ2 is smaller than the excess air ratio λ1 (λ1>λ2), the controller 11 recognizes the state of regeneration in the SCR catalytic converter 13 and moves to step S116. At step 116, the controller 11 performs a control so that the excess air ratio φλ2 is adjusted to cause excess of air (λ2≥1) to prevent deficient of oxygen and nitrogen oxide in the SCR catalytic converter 13. Specifically, the controller 11 transmits a signal to the combustion state controller 21 to change the mixing ratio in the internal combustion engine 22 from stoichiometric ratio to lean mixture ratio so that the excess air ratio λ2 is adjusted to cause excess of air (λ2≥1). The controller 11 sets the discriminant index $N_1$=1 at step S118, and moves to step 124. The processing at step S116 is an example of the second control of the present disclosure.

Since the absorption capacity of the SCR catalytic converter 13 is restored by consumption of absorbed ammonia, the state in the above-described processing represents the state of regeneration in the SCR catalytic converter 13.

In the SCR catalytic converter 13 having a function of an absorption catalyst, the excess air ratio λ2 is preferably greater than 1 (λ2>1). However, the excess air ratio λ2 is preferably equal to 1 (λ2=1) if noble metal-supported zeolite is used for the absorption catalyst.

As described above, the catalytic reaction in the three-way catalytic converter 12 reduces outflow of ammonia from the three-way catalytic converter 12, and regeneration of the SCR catalytic converter 13 decreases and finally eliminates ammonia flowing into the SCR catalytic converter 13. This decreases and finally eliminates the difference in the excess air ratio λ between upstream and downstream of the SCR catalytic converter 13 ($\lambda 2=\lambda 1$). That is, the composition of the exhaust (exhaust gas) flowing into the SCR catalytic converter 13 is identical to the composition of the exhaust (exhaust gas) flowing out of the SCR catalytic converter 13 in a state where ammonia in the SCR catalytic converter 13 is eliminated by sufficient purification of ammonia, so that the excess air ratio becomes $\lambda 1=\lambda 2$. This allows a determination that the state where the excess air ratio $\lambda 1$ is equal to $\lambda 2$ ($\lambda 1=\lambda 2$) represents the state of regeneration completion in the SCR catalytic converter 13.

The above description shows a case where the decrease of ammonia flowing into the SCR catalytic converter 13 eliminates the difference in the excess air ratio λ between downstream and upstream of the SCR catalytic converter 13 ($\lambda 2=\lambda 1$), however, it is not limited thereto. For example, it may be regarded that the excess air ratio $\lambda 1$ upstream of the SCR catalytic converter 13 is equal to the excess air ratio 2 downstream of the SCR catalytic converter 13 ($\lambda 1=2$) in a case where the difference between the excess air ratio $\lambda 1$ and the excess air ratio $\lambda 2$ is within a predetermined range.

When the controller 11 determines at step S110 that the excess air ratio $\lambda 1$ is equal to the excess air ratio $\lambda 2$ ($\lambda 1=\lambda 2$), the controller 11 moves to step S120. At step S120, the controller 11 performs a control according to the state of regeneration completion in the SCR catalytic converter 13 so that the excess air ratio $\lambda 1$ becomes a predetermined value ($\lambda 1=1$), which indicates no excess or deficiency of air. Specifically, the controller 11 transmits a signal to the combustion state controller 21 to change the mixing ratio in the internal combustion engine 22 so that the excess air ratio $\lambda 1$ becomes the predetermined value ($\lambda 1=1$). If the state of absorption in the SCR catalytic converter 13 and the state of regeneration in the SCR catalytic converter 13 are experienced ($N_0 \cdot N_1 > 0$), the controller 11 recognizes the state of regeneration completion in the SCR catalytic converter 13 and sets the discriminant index $N_2=1$ at step S122, and moves to step 124. In other cases, the controller 11 moves to step S124 without newly setting (while maintaining the discriminant index $N_2$). The processing at step S120 is an example of the third control of the present disclosure.

The processing at step S120 is performed when the excess air ratio $\lambda 1$ is equal to the excess air ratio $\lambda 2$ as a result of absorption in the SCR catalytic converter 13, i.e., absorption of ammonia, or as a result of regeneration in the SCR catalytic converter 13, i.e., regeneration of an SCR catalyst.

The controller 11 determines at step S124 whether $N_0 \cdot N_1 \cdot N_2$ is greater than zero ($N_0 \cdot N_1 \cdot N_2 > 0$) to determine whether the controls with the states of absorption, regeneration, and regeneration completion in the SCR catalytic converter 13 is completed. That is, the controller 11 determines, at the start of the internal combustion engine 22, whether the sequence of controls with absorption, regeneration, and regeneration completion in the SCR catalytic converter 13 is completed once.

When the sequence of controls with absorption, regeneration, and regeneration completion in the SCR catalytic converter 13 is not completed ($N_0 \cdot N_1 \cdot N_2 = 0$), the controller 11 determines $N_0$ at step S124 and returns to step S102. When the controller 11 determines Yes ($N_0 \cdot N_1 \cdot N_2 > 0$) at step S124, the controller 11 resets the discriminant index $N_i$ ($N_0=0$, $N_1=0$, $N_2=0$) at step S126 and increments the count value M ($M=M+1$) at step S128, and returns to step S102.

The control is preferably performed in a case where the temperature of the SCR catalytic converter 13 reaches the predetermined catalytic reaction start temperature after the temperature of the three-way catalytic converter 12 becomes equal to or higher than the predetermined catalytic reaction start temperature. The control may be performed in a case where the temperature of the SCR catalytic converter 13 reaches the activation temperature before the temperature of the three-way catalytic converter 12 reaches the activation temperature. In this case, both of ammonia flowed into the SCR catalytic converter 13 and absorbed ammonia are oxidized, so that the SCR catalytic converter 13 is regenerated. In this case, the excess air ratio λ changes from $\lambda 2 > \lambda 1$ to $\lambda 1 > \lambda 2$.

The exhaust gas purification apparatus 10 effectively operates at the start of the internal combustion engine 22, for example, at the period from the start to the warm-up of the internal combustion engine 22. The exhaust gas purification apparatus according to the present disclosure also effectively operates during the operation of the internal combustion engine 22. For example, the aforementioned control allows determination of absorption of ammonia in the SCR catalytic converter 13 for regeneration even if an air-fuel mixing ratio control does not follow the rapid change of the load of the internal combustion engine 22 and ammonia flows out of the three-way catalytic converter 12 without being purified.

It is effective to detect an abnormality in the exhaust gas purification apparatus 10 and inform a user of the abnormality. As described above, the timing of start of ammonia purification by the three-way catalytic converter 12 is determined by a match between the excess air ratio $\lambda 1$ and the excess air ratio $\lambda 2$ ($\lambda 1=\lambda 2$), but if there is a continuous difference between $\lambda 1$ and $\lambda 2$ ($\lambda 1 < > \lambda 2$), an abnormality may occur in a catalyst system. If duration of the continuous difference exceeds a predetermined duration that is previously determined for abnormality detection, the excess of duration of the continuous difference may be detected as an abnormality in the catalyst system. The detected abnormality has to be informed. That is, the controller 11 may perform a control so that abnormality information is emitted if the difference between the excess air ratio $\lambda 1$ and the excess air ratio $\lambda 2$ is out of a predetermined range after the elapse of a predetermined time after the start of the first control or the second control.

Figure 7:
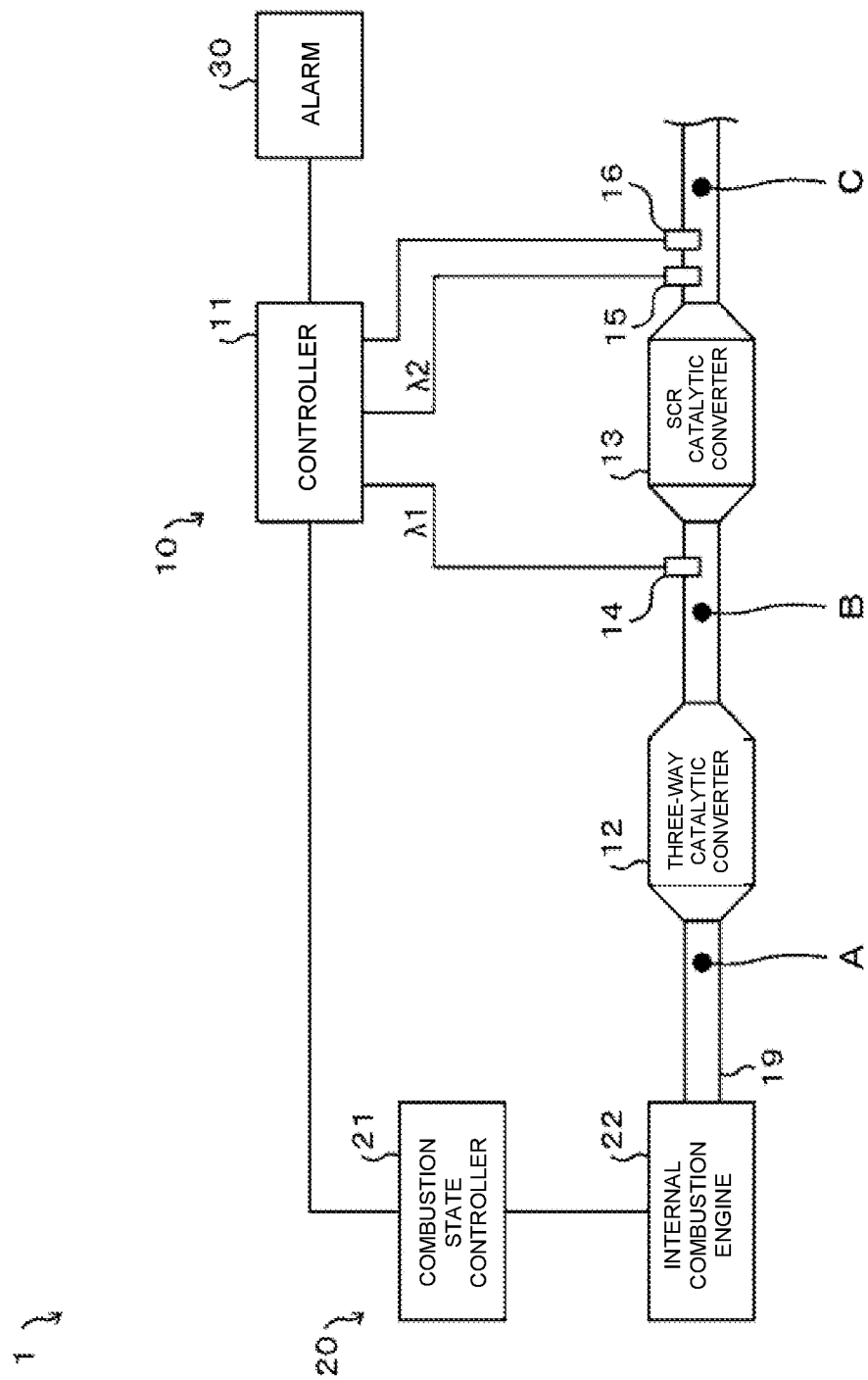
FIG. 7 is a schematic diagram of the exhaust gas purification apparatus according to the embodiment of the present disclosure, including an alarm.

For example, as illustrated in FIG. 7, the exhaust gas purification apparatus 10 may include an alarm 30 that is configured to emit warning information, and the controller 11 controls the alarm 30. The warning information may include abnormality information of the catalyst system. The catalyst system abnormality information indicates that there is a continuous difference between the excess air ratio $\lambda 1$ and the excess air ratio $\lambda 2$ ($\lambda 1 < > \lambda 2$) and an abnormality in the catalyst system may have occurred. The aforementioned control may further include a control to be performed so that the controller 11 determines at step S110 whether the duration of the continuous difference ($\lambda 1 < > \lambda 2$) in the excess air ratio exceeds the predetermined duration and warning information of an abnormality in the catalyst system is emitted if the duration of the continuous difference exceeds the predetermined duration. This warning information may be used for diagnosis of the exhaust gas purification apparatus 10. The duration of the continuous difference is determined by measuring time that the difference in excess air ratio has continued since the start of the control. The measurement of the duration is not limited thereto, and the measurement of the duration may start at the time of the occurrence of the difference in excess air ratio.

FIGS. 3 to 6 are graphs showing changes in states of regions related to the SCR catalytic converter 13 after the start of the internal combustion engine 22.

Figure 3:
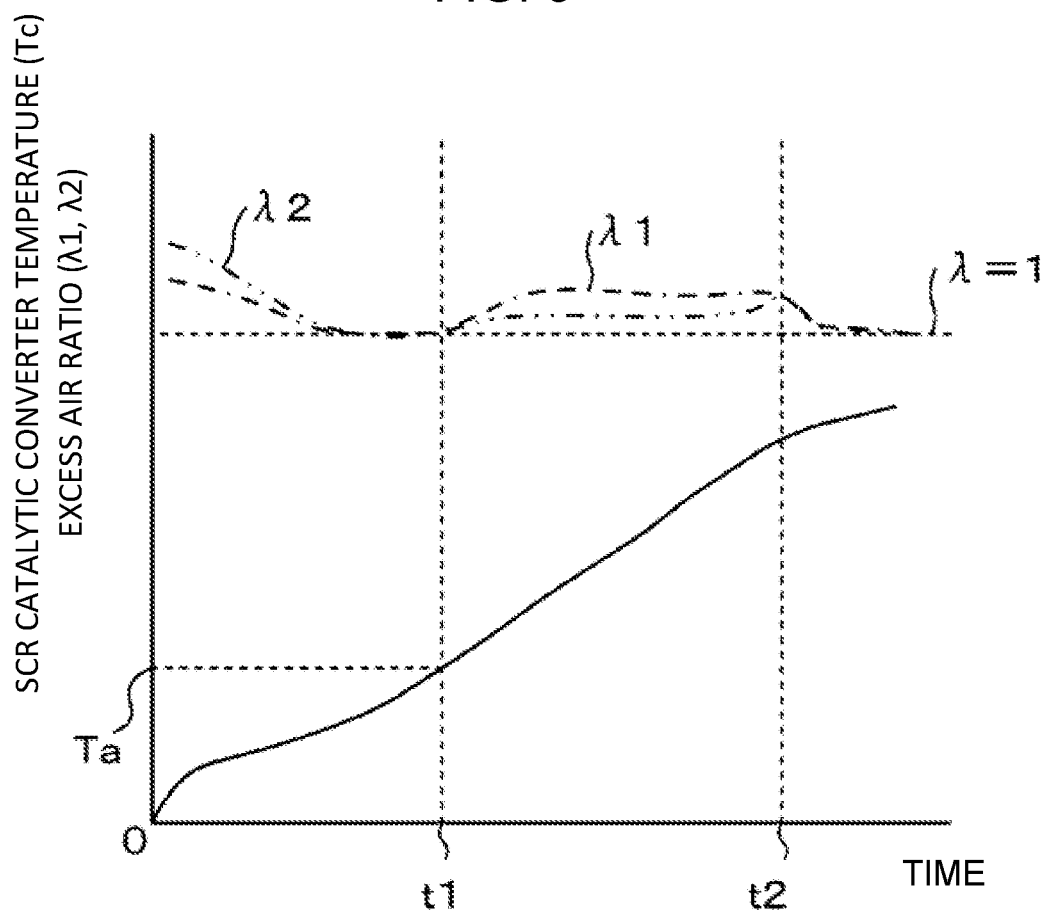
FIG. 3 is a graph showing a characteristic relating to a temperature of a selective reduction catalytic converter of the exhaust gas purification apparatus according to the embodiment of the present disclosure, and a characteristic relating to mixing ratios of exhaust upstream and downstream of the selective reduction catalytic converter.

FIG. 3 shows a time-dependent change in the temperature of the SCR catalytic converter 13 and the excess air ratios upstream and downstream of the SCR catalytic converter 13 after the start of the internal combustion engine 22. FIG. 3 shows the time-dependent change in the excess air ratios in the exhaust (exhaust gas) from the internal combustion engine 22 around the inlet and the outlet of the SCR catalytic converter 13. In FIG. 3, the time-dependent change in the temperature of the SCR catalytic converter 13 is indicated by the solid line. The time-dependent change in the excess air ratio $\lambda 1$ at the position B (FIG. 1) upstream of the SCR catalytic converter 13 is indicated by the chain line, and the time-dependent change in the excess air ratio $\lambda 2$ at the position C (FIG. 1) downstream of the SCR catalytic converter 13 is indicated by the chain double-dashed line.

Figure 4:
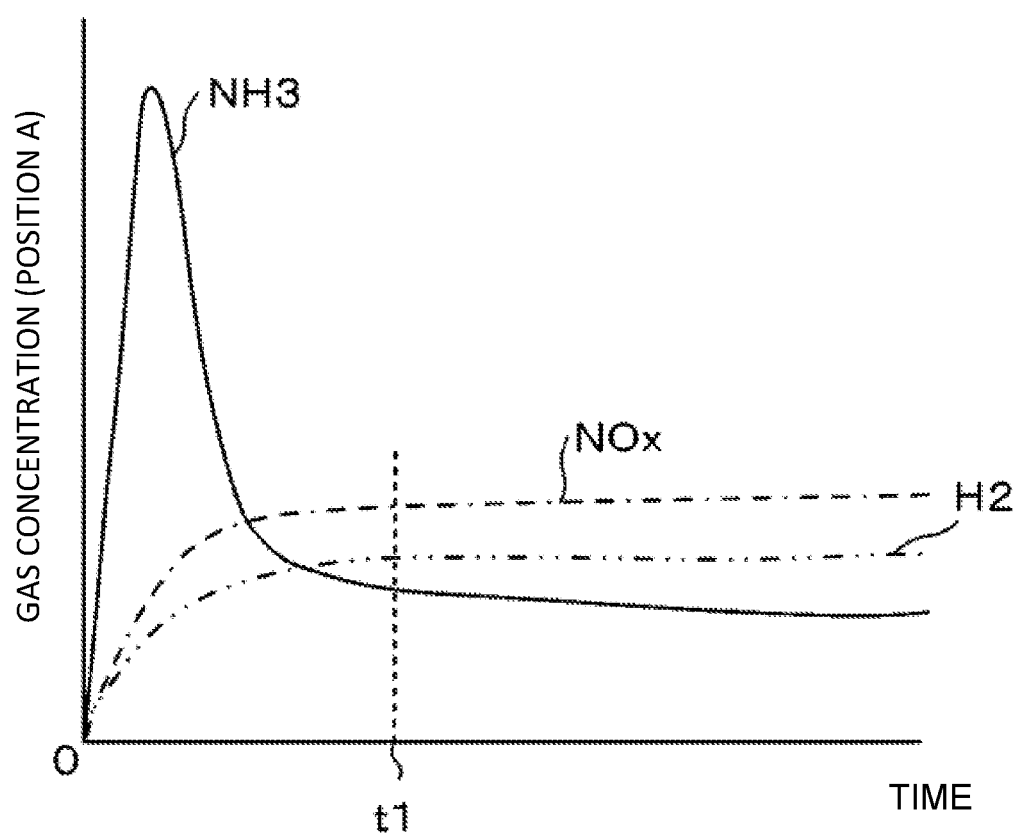
FIG. 4 is a graph showing a relationship between ammonia ($NH_3$) concentration, nitrogen oxide (NOx) concentration, and hydrogen ($H_2$) concentration in exhaust at a first region in an exhaust flow passage of an internal combustion engine.
Figure 5:
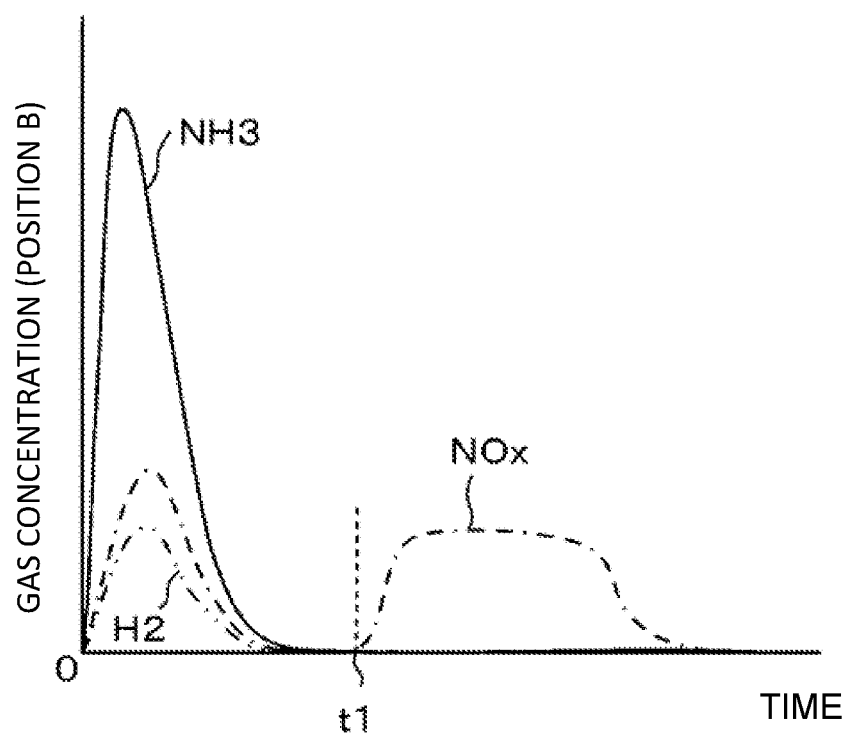
FIG. 5 is a graph showing a relationship between ammonia ($NH_3$) concentration, nitrogen oxide (NOx) concentration, and hydrogen ($H_2$) concentration in the exhaust at a second region in the exhaust flow passage of the internal combustion engine.
Figure 6:
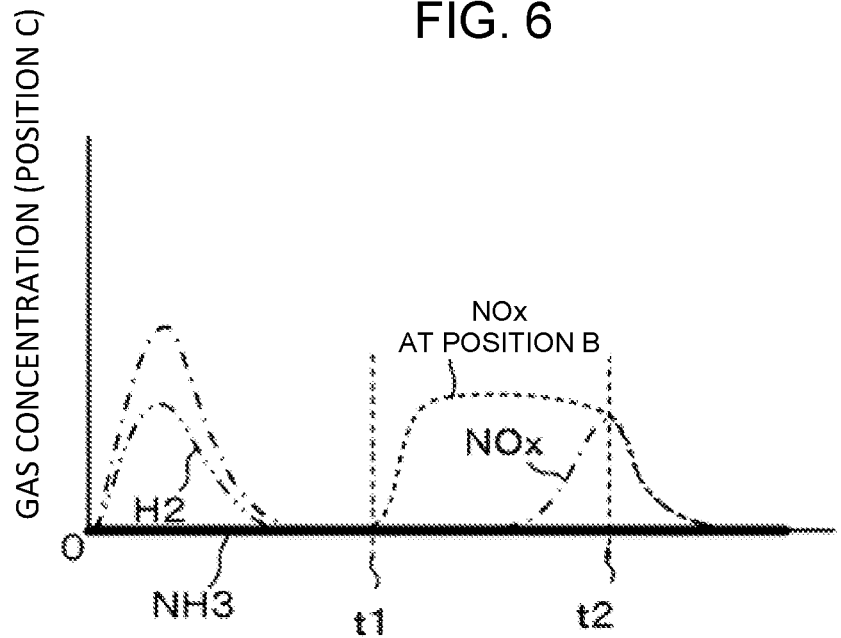
FIG. 6 is a graph showing a relationship between nitrogen oxide (NOx) concentration and hydrogen ($H_2$) concentration in the exhaust at a third region in the exhaust flow passage of the internal combustion engine.

FIGS. 4 to 6 are graphs showing a time-dependent change in gas concentration of the exhaust (exhaust gas) from the internal combustion engine 22 at different positions in the exhaust pipe 19. Specifically, FIG. 4 shows the time-dependent change in ammonia concentration ($NH_3$), NOx concentration (NOx), and hydrogen concentration ($H_2$) as the gas concentration of the exhaust (exhaust gas) flowing into the SCR catalytic converter 13. FIG. 4 shows the time-dependent change in the gas concentration of the exhaust (exhaust gas) at the position A (FIG. 1) upstream of the three-way catalytic converter 12 around the outlet of the internal combustion engine 22. FIG. 5 shows the time-dependent change in the gas concentration at the position B (FIG. 1) upstream of the SCR catalytic converter 13 around the inlet of the SCR catalytic converter 13. FIG. 6 shows the time-dependent change in the gas concentration at the position C (FIG. 1) downstream of the SCR catalytic converter 13 around the outlet of the SCR catalytic converter 13. In FIGS. 4 to 6, the time-dependent change in ammonia concentration ($NH_3$) is indicated by the solid line, the time-dependent change in NOx concentration (NOx) is indicated by the chain line, and the time-dependent change in hydrogen concentration ($H_2$) is indicated by the chain double-dashed line. In FIG. 6, the time-dependent change in NOx concentration (NOx) at the position B is indicated by the dotted line.

The following will describe time-dependent changes in the states of the regions caused by the control in FIG. 2 with reference to FIGS. 3 to 6.

The exhaust (exhaust gas) from the internal combustion engine 22 contains water vapor and nitrogen, and further contains incomplete combustion components, such as unburned ammonia, hydrogen, and nitrogen oxide. Ammonia has irritating odor even at low concentration and may be highly hazardous to the human body when the concentration of ammonia is high, and emission of ammonia therefore should be prevented. The exhaust gas purification apparatus 10 of the present disclosure changes the air flow rate and fuel supply amount to the internal combustion engine 22 to reduce emission of at least ammonia in the exhaust gas.

When the internal combustion engine 22 starts, the temperature of the three-way catalytic converter 12 is gradually increased by the high temperature exhaust (exhaust gas) emitted from the internal combustion engine 22, and incomplete combustion components in the three-way catalytic converter 12, which has flowed into the three-way catalytic converter 12 by the time the temperature reached the catalytic reaction start temperature in the three-way catalytic converter 12, flows from the three-way catalytic converter 12 into the SCR catalytic converter 13. The exhaust (exhaust gas) flows into the SCR catalytic converter 13 and gradually increases the temperature of the SCR catalytic converter 13.

As shown in FIG. 4, as the internal combustion engine 22 starts, ammonia concentration ($NH_3$) rapidly increases in the vicinity of the outlet of the internal combustion engine 22 (at the position A) due to the large amount of unburned ammonia in the internal combustion engine 22. After that, ammonia concentration ($NH_3$) gradually decreases due to stabilization of combustion in the internal combustion engine 22.

Ammonia flows through the three-way catalytic converter 12 and is absorbed in the SCR catalytic converter 13, so that the balance of gas composition changes and the excess air ratio $\lambda 2$ downstream of the SCR catalytic converter 13 becomes greater than the excess air ratio $\lambda 1$ upstream of the SCR catalytic converter 13 ($\lambda 1 < \lambda 2$) as illustrated in FIGS. 5 and 6. Ammonia is oxidized with the increase of the temperature of the three-way catalytic converter 12, and therefore prevented from flowing into the SCR catalytic converter 13, so that the excess air ratio $\lambda 1$ upstream of the SCR catalytic converter 13 and the excess air ratio $\lambda 2$ downstream of the SCR catalytic converter 13 become closer to the value indicating no excess or deficient of air ($\lambda = 1$). In this state, the mixing ratio is controlled to be stoichiometric ratio, and as shown in FIGS. 5 and 6, ammonia concentration ($NH_3$), NOx concentration (NOx), and hydrogen concentration ($H_2$) in the exhaust (exhaust gas) become approximately zero ($\lambda 2 = \lambda 1$) before the temperature of the SCR catalytic converter 13 reaches the predetermined temperature (activation temperature) Ta. The equality of $\lambda 2$ and $\lambda 1$ ($\lambda 2 = \lambda 1$) indicates that ammonia has been purified by the three-way catalytic converter 12. The incomplete combustion components generated by insufficient catalytic reaction in the three-way catalytic converter 12 flow into the SCR catalytic converter 13, but ammonia is absorbed in the SCR catalytic converter 13. Accordingly, a hazardous substance in the exhaust, such as ammonia, is purified.

On the other hand, when the temperature of the SCR catalytic converter 13 reaches the predetermined temperature (activation temperature) Ta (time t1), as shown in FIG. 3, the excess air ratio $\lambda 1$ is controlled so that the excess air ratio $\lambda 1$ upstream of the SCR catalytic converter 13 changes from stoichiometric ratio to lean mixture ratio. Nitrogen oxide (NOx) flows into the SCR catalytic converter 13, so that ammonia absorbed in the SCR catalytic converter 13 is converted to nitrogen and water by SCR reaction in the SCR catalytic converter 13 as described above. Ammonia is added to the gas composition of the exhaust (exhaust gas) flowing into the SCR catalytic converter 13 during the SCR reaction, and this causes a change in the excess air ratio $\lambda 1$ and the excess air ratio $\lambda 2$ and therefore generates a difference between the excess air ratio $\lambda 1$ and the excess air ratio $\lambda 2$. That is, the progression of the SCR reaction in the SCR catalytic converter 13 reverses the ratio between the excess air ratio upstream and the excess air ratio downstream of the SCR catalytic converter 13 as shown in FIG. 3, so that the excess air ratio $\lambda 2$ downstream of the SCR catalytic converter 13 becomes smaller than the excess air ratio $\lambda 1$ upstream of the SCR catalytic converter 13 ($\lambda 1 > \lambda 2$).

When the excess air ratio $\lambda$ in the SCR catalytic converter 13 is $\lambda 1 > \lambda 2$, the excess air ratio $\lambda 2$ is adjusted to cause excess of air ($\lambda 2 \geq 1$) to prevent deficiency of oxygen and nitrogen oxide in the SCR catalytic converter 13. In the SCR catalytic converter 13, regeneration in the SCR catalytic converter 13 progresses until the absorption capacity of the SCR catalytic converter 13 is restored by consumption of absorbed ammonia.

That is, when the excess air ratio $\lambda 2$ downstream of the SCR catalytic converter 13 is adjusted (i.e., the mixing ratio is changed from stoichiometric ratio to lean mixture ratio) to cause excess of air ($\lambda 2 \geq 1$), NOx reduction by the three-way catalytic converter 12 does not progress sufficiently, and NOx in the exhaust is discharged from the three-way catalytic converter 12 to the SCR catalytic converter 13 as illustrated in FIG. 5. In this state, the temperature of the SCR catalytic converter 13 is equal to or higher than the predetermined temperature (activation temperature) Ta, so that NOx-reduction reaction becomes active in the SCR catalytic converter 13. The reduction of NOx in the exhaust progresses in the SCR catalytic converter 13 by using stored ammonia as a reducing agent. This reduction in the SCR catalytic converter 13 reduces NOx in the SCR catalytic converter 13 as shown in FIG. 6.

When the temperature of the SCR catalytic converter 13 becomes equal to or higher than the predetermined temperature (activation temperature) Ta, the mixing ratio of the exhaust upstream of the three-way catalytic converter 12 and the SCR catalytic converter 13 is changed from stoichiometric ratio to lean mixture ratio so that the excess air ratio $\lambda 2$ is adjusted to cause excess of air. This causes the state of regeneration in the SCR catalytic converter 13 to allow reduction reaction of NOx in the exhaust by ammonia absorbed in the SCR catalytic converter 13, thereby reducing emission of ammonia and removing ammonia absorbed in the SCR catalytic converter 13.

As described above, catalytic reaction in the three-way catalytic converter 12 and absorption and regeneration in the SCR catalytic converter 13 reduce ammonia flowing into the SCR catalytic converter 13, thereby decreasing and finally eliminating the difference in the excess air ratio $\lambda$ between downstream and upstream of the SCR catalytic converter 13 ($\lambda 2 = \lambda 1$). The combustion in the internal combustion engine 22 is stable in the state of $\lambda 1 = \lambda 2$ as the state of regeneration completion in the SCR catalytic converter 13 (time t2) (FIG. 3), so that concentration of ammonia from the internal combustion engine 22 is approximately constant. Furthermore, oxidation reaction of ammonia and NOx reduction reaction progress in the three-way catalytic converter 12, so that ammonia and NOx in the exhaust are purified in the three-way catalytic converter 12 and are not emitted from the three-way catalytic converter 12. Ammonia does not flow into the SCR catalytic converter 13, so that the excess air ratio does not change between upstream and downstream of the SCR catalytic converter 13 ($\lambda 1 = \lambda 2$). Then, the excess air ratio $\lambda 1$ upstream of the SCR catalytic converter 13 is changed (the mixing ratio is changed from lean mixture ratio to stoichiometric ratio) to the predetermined value ($\lambda 1 = 1$) indicating no excess or deficient of air.

Changing the excess air ratio $\lambda 1$ upstream of the SCR catalytic converter 13 to the predetermined value ($\lambda 1 = 1$) indicating no excess or deficient of air allows oxidation reaction of ammonia in the exhaust and reduction reaction of NOx in the exhaust by the three-way catalytic converter 12, thereby reducing emission of ammonia (FIG. 6).

The internal combustion engine 22 may stop, and restart after the temperature of the three-way catalytic converter 12 and the temperature of the SCR catalytic converter 13 return to an ambient temperature, such as a temperature lower than the activation temperature, after the stop of the internal combustion engine 22. Even in such a case, the aforementioned processing can be repeatedly performed because ammonia stored in the SCR catalytic converter 13 has been removed.

As described above, the exhaust gas purification apparatus 10 according to the embodiment may determine the states of absorption in the SCR catalytic converter 13 and regeneration in the SCR catalytic converter 13 based on the magnitude relationship between the excess air ratio upstream of the SCR catalytic converter 13 and the excess air ratio downstream of the SCR catalytic converter 13 when the exhaust from the internal combustion engine 22 is purified. Accordingly, the control of the mixing ratio according to the determined state enables efficient and reliable purification of the exhaust from the internal combustion engine 22. Furthermore, determining the state of the regeneration completion in the SCR catalytic converter 13 based on the magnitude relationship between the excess air ratio upstream of the SCR catalytic converter 13 and the excess air ratio downstream of the SCR catalytic converter 13 enables more efficient and reliable purification of the exhaust compared with the purification of the exhaust according to the determined states of absorption in the SCR catalytic converter 13 and regeneration in the SCR catalytic converter 13.

In the exhaust gas purification apparatus 10 according to the embodiment, the three-way catalytic converter 12 is disposed upstream in the main flow passage, so that the temperature of the three-way catalytic converter 12 is likely to increase and time to reach the predetermined temperature (activation temperature) Ta of the three-way catalytic converter 12 is reduced. Furthermore, there is a characteristic that the saturated absorption amount of ammonia in the SCR catalytic converter 13 decreases with the increase of the temperature of the catalyst. In the exhaust gas purification apparatus 10 according to the embodiment, the SCR catalytic converter 13 is disposed downstream in the main flow passage, so that the temperature of the SCR catalytic converter 13 is unlikely to increase and the decrease in the saturated absorption amount of ammonia in the SCR catalytic converter 13 is suppressed.

MODIFICATION OF EMBODIMENT

The present disclosure is not limited to the aforementioned embodiment but may be implemented in various aspects to the extent without departing from the gist of the present disclosure, and the embodiment of the present disclosure may be modified as below.

Modification 1

The aforementioned embodiment shows an example of the configuration of the engine system. However, the configuration of the engine system may be modified variously. For example, the engine system may further include an unillustrated device (e.g., device for monitoring the states of the three-way catalytic converter and the SCR catalytic converter).

Modification 2

The exhaust gas purification apparatus may further include various catalytic devices with different functions, such as NOx storage reduction catalyst, (NSR) catalyst, oxidation catalyst (diesel oxidation catalyst (DOC)), and diesel particulate filter (DPF). Such catalytic devices may be arbitrarily arranged.

Modification 3

The aforementioned embodiment shows an example of controls by the controller. However, the controls by the controller may be variously modified. For example, some steps of steps S100 to S128 may be skipped, and some steps may be added.

The above description of the present disclosure based on the embodiment and modifications is intended to facilitate understanding of the present disclosure and is not intended to limit the present disclosure. The present disclosure may be modified and improved without departing from the intent and scope of the claims, and the present disclosure includes equivalents thereof. If the technical features are not described as essential features in the present specification, such technical features may be deleted as appropriate.

REFERENCE SIGNS LIST

1 Engine system
10 Exhaust gas purification apparatus
11 Controller
12 Three-way catalytic converter
13 SCR catalytic converter
14 First mixing ratio acquirer
15 Second mixing ratio acquirer
16 Temperature acquirer
19 Exhaust pipe
20 Combustion apparatus
21 Combustion state controller
22 Internal combustion engine
$\lambda, \lambda_1, \lambda_2$ Excess air ratio
A Position
B Position
C Position
M Count value
$M_{max}$ Maximum value $N_i$ ($N_0$, $N_1$, $N_2$) Discriminant index
Ta Predetermined temperature

The invention claimed is:

1. An exhaust gas purification apparatus comprising:
an oxidation reduction catalytic converter disposed in a main flow passage through which exhaust flows from an internal combustion engine that is configured to combust ammonia to obtain a driving force, the oxidation reduction catalytic converter being configured to provide oxidation catalysis and reduction catalysis;
a selective reduction catalytic converter disposed downstream of the oxidation reduction catalytic converter in the main flow passage and configured to absorb ammonia having flowed through the oxidation reduction catalytic converter;
a temperature acquirer configured to acquire a temperature of a region related to a temperature of the selective reduction catalytic converter;
a mixing ratio acquirer configured to acquire mixing ratios of the exhaust upstream and downstream of the selective reduction catalytic converter, wherein the mixing ratios indicate a relationship of ammonia and oxygen; and
a controller configured to perform a first control or a second control based on the mixing ratios of the exhaust acquired by the mixing ratio acquirer when the temperature acquired by the temperature acquirer is higher than a predetermined temperature that indicates activation of the selective reduction catalytic converter, the controller being configured to perform the first control when the mixing ratio of the exhaust downstream of the selective reduction catalytic converter is greater than the mixing ratio of the exhaust upstream of the selective reduction catalytic converter so that the first control changes the mixing ratio of the exhaust upstream of the oxidation reduction catalytic converter to change the mixing ratio of the exhaust upstream of the selective reduction catalytic converter from stoichiometric ratio to lean mixture ratio, the controller being configured to perform the second control when the mixing ratio of the exhaust downstream of the selective reduction catalytic converter is smaller than the mixing ratio of the exhaust upstream of the selective reduction catalytic converter so that the second control changes the mixing ratio of the exhaust upstream of the oxidation reduction catalytic converter to change the mixing ratio of the exhaust downstream of the selective reduction catalytic converter from stoichiometric ratio to lean mixture ratio.

2. The exhaust gas purification apparatus according to claim 1, wherein
the controller is configured to perform a third control when a difference between the mixing ratio of the exhaust upstream of the selective reduction catalytic converter and the mixing ratio of the exhaust downstream of the selective reduction catalytic converter is within a predetermined range so that the third control changes the mixing ratio of the exhaust upstream of the selective reduction catalytic converter from lean mixture ratio to stoichiometric ratio.

3. The exhaust gas purification apparatus according to claim 2, wherein
the controller is configured to perform a control so that abnormality information is emitted if the difference is out of a predetermined range after elapse of a predetermined time after start of the first control or the second control.

4. The exhaust gas purification apparatus according to claim 2, wherein
the controller is configured to perform the first control, the second control, and the third control at least once at start of the internal combustion engine.

5. An exhaust gas purification method for purifying exhaust from an internal combustion engine that is configured to combust ammonia to obtain a driving force, by using an oxidation reduction catalytic converter and a selective reduction catalytic converter, the exhaust gas purification method comprising:
acquiring a temperature of a region related to a temperature of the selective reduction catalytic converter;
acquiring mixing ratios of the exhaust upstream and downstream of the selective reduction catalytic converter, wherein the mixing ratios indicate a relationship of ammonia and oxygen; and
performing a first control or a second control based on the acquired mixing ratios of the exhaust when the acquired temperature is higher than a predetermined temperature that indicates activation of the selective reduction catalytic converter, wherein the first control is performed when the mixing ratio of the exhaust downstream of the selective reduction catalytic converter is greater than the mixing ratio of the exhaust upstream of the selective reduction catalytic converter so that the first control changes the mixing ratio of the exhaust upstream of the oxidation reduction catalytic converter to change the mixing ratio of the exhaust upstream of the selective reduction catalytic converter from stoichiometric ratio to lean mixture ratio, and wherein the second control is performed when the mixing ratio of the exhaust downstream of the selective reduction catalytic converter is smaller than the mixing ratio of the exhaust upstream of the selective reduction catalytic converter so that the second control changes the mixing ratio of the exhaust upstream of the oxidation reduction catalytic converter to change the mixing ratio of the exhaust downstream of the selective reduction catalytic converter from stoichiometric ratio to lean mixture ratio.

* * * * *